United States Patent
Liao et al.

(10) Patent No.: US 10,073,529 B2
(45) Date of Patent: Sep. 11, 2018

(54) TOUCH AND GESTURE CONTROL SYSTEM AND TOUCH AND GESTURE CONTROL METHOD

(71) Applicant: Coretronic Corporation, Hsin-Chu (TW)

(72) Inventors: Chien-Chung Liao, Hsin-Chu (TW); Yung-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 456 days.

(21) Appl. No.: 14/751,116

(22) Filed: Jun. 25, 2015

(65) Prior Publication Data
US 2016/0139672 A1 May 19, 2016

(30) Foreign Application Priority Data
Nov. 14, 2014 (TW) .............................. 103139590 A

(51) Int. Cl.
*G06F 3/042* (2006.01)
*G06F 3/01* (2006.01)
(Continued)

(52) U.S. Cl.
CPC .............. *G06F 3/017* (2013.01); *G06F 3/005* (2013.01); *G06F 3/0304* (2013.01);
(Continued)

(58) Field of Classification Search
CPC ........ G06F 3/005; G06F 3/017; G06F 3/0304; G06F 3/0421; G06F 3/0425;
(Continued)

(56) References Cited

U.S. PATENT DOCUMENTS

| 6,803,906 B1 | 10/2004 | Morrison |
| 8,515,128 B1 * | 8/2013 | Hildreth .................. G06F 3/017 345/156 |

(Continued)

FOREIGN PATENT DOCUMENTS

| CN | 202257528 | 5/2012 |
| TW | 200641649 | 12/2006 |

(Continued)

OTHER PUBLICATIONS

"Office Action of Taiwan Counterpart Application", dated Sep. 25, 2015, p. 1-p. 10.

*Primary Examiner* — Nelson Rosario
(74) *Attorney, Agent, or Firm* — JCIPRNET

(57) ABSTRACT

A touch and gesture control system including a light curtain module, an invisible light lighting module, an image capturing module and a control unit is provided. The light curtain module is configured to form a touch zone. The invisible light lighting module is configured to form a gesture control zone. The touch zone and the gesture control zone are at least partially overlapped. The control unit is electrically connected to the light curtain module, the image capturing module and the invisible light lighting module. The control unit turns on the light curtain module and controls the image capturing module to capture a first set of images when executing a touch mode, and turns on the invisible light lighting module and controls the image capturing module to capture a second set of images when executing a gesture control mode. A touch and gesture control method is also provided.

20 Claims, 10 Drawing Sheets

(51) Int. Cl.
*G06F 3/0488* (2013.01)
*G06F 3/00* (2006.01)
*G06F 3/03* (2006.01)

(52) U.S. Cl.
CPC .......... *G06F 3/0421* (2013.01); *G06F 3/0425* (2013.01); *G06F 3/0488* (2013.01); *G06F 3/04883* (2013.01); *G06F 2203/04808* (2013.01)

(58) Field of Classification Search
CPC ............... G06F 3/0488; G06F 3/04883; G06F 2203/04808; G06F 2203/048
See application file for complete search history.

(56) References Cited

U.S. PATENT DOCUMENTS

| | | |
|---|---|---|
| 2007/0035521 A1 | 2/2007 | Jui et al. |
| 2010/0091110 A1 | 4/2010 | Hildreth |
| 2010/0207876 A1 | 8/2010 | Lin |
| 2012/0038986 A1 | 2/2012 | Pesach |
| 2013/0161491 A1 | 6/2013 | Lu et al. |
| 2013/0343601 A1 | 12/2013 | Jia et al. |
| 2014/0210715 A1* | 7/2014 | Yang ................ G06F 3/03547 345/158 |
| 2014/0313166 A1* | 10/2014 | Rattray ................ H04N 9/3179 345/175 |
| 2015/0049309 A1* | 2/2015 | Sumiyoshi ............ G03B 21/26 353/31 |
| 2016/0092031 A1* | 3/2016 | Chen .................. G06F 3/04886 345/175 |

FOREIGN PATENT DOCUMENTS

| | | |
|---|---|---|
| TW | 201135558 | 10/2011 |
| TW | 201416944 | 5/2014 |
| TW | 201428415 | 7/2014 |

* cited by examiner

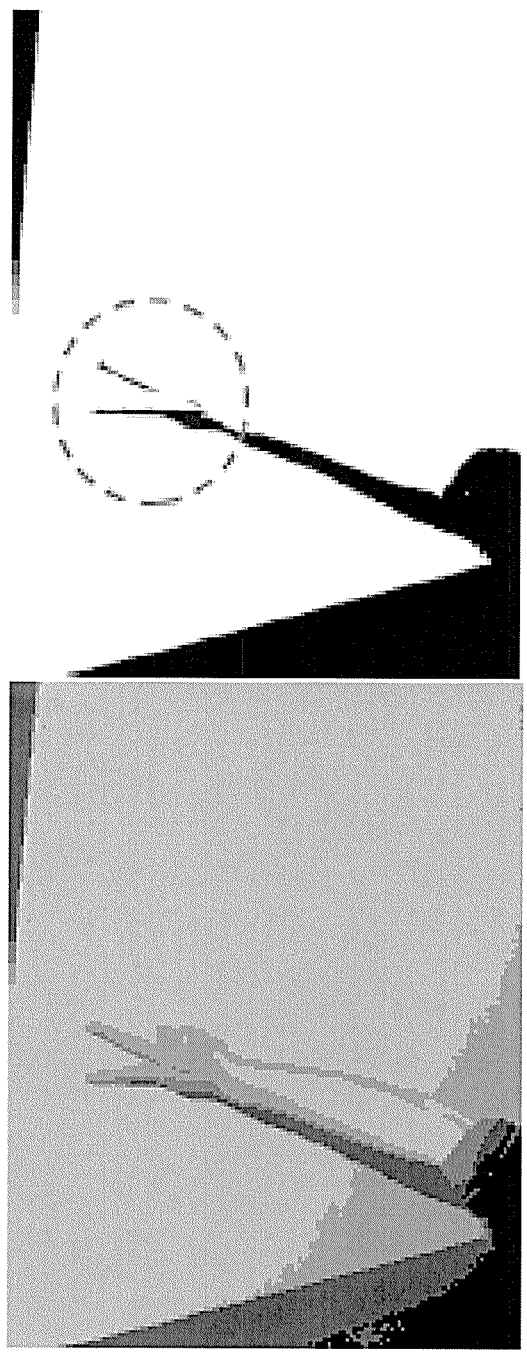

TOUCH AND GESTURE CONTROL SYSTEM AND TOUCH AND GESTURE CONTROL METHOD

CROSS-REFERENCE TO RELATED APPLICATION

This application claims the priority benefit of Taiwan application serial no. 103139590, filed on Nov. 14, 2014. The entirety of the above-mentioned patent application is hereby incorporated by reference herein and made a part of this specification.

BACKGROUND OF THE INVENTION

Field of the Invention

The invention relates to a control system and a control method, and particularly relates to a touch and gesture control system and a touch and gesture control method.

Description of Related Art

Recently, as information and electronic technologies progress, touch panels have been widely applied and led to applications and developments of consumer electronics products. Since touch panels have the advantages of high durability, fast response, saving space, and facilitating communication, touch panels have become an independent industry.

Based on the working principles, the technologies of touch panels used with large-sized display apparatuses include projected capacitive, matrix resistive, optical image, infrared matrix, and surface acoustic wave types of touch panels. The technologies of projected resistive and matrix resistive touch panels are implemented by adhering a touch film or glass on a polarizer of the display panel for touch sensing operations. However, as the screen size increases, the issues of low yield rate and high manufacturing cost arise. As for the technology of infrared matrix touch panels, due to the size limit, the requirement of high resolution cannot be met. Besides, the cost of a large number of infrared light emitting modules in these panels is also high.

Thus, considering the cost and quality, the technology of optical image touch panels is at a lower cost and capable of sensing touches of a variety of materials, including any light-shielding substances such as human fingers or metal. Thus, this type of touch panels is broadly applied and has the potential for further development. However, the conventional optical image touch technology only offers the touch function without having the function of gesture control at the same time. When it is required to include the function of gesture control, an additional gesture control module at a high cost needs to be added, making it more difficult to manufacture.

U.S. Publication No. 2010/0091110 discloses a camera tracking system, including a camera, a display apparatus, an illuminator, and a computer apparatus. China Patent No. 202257528U discloses a screen input system, including an operating screen, a touch apparatus, a laser light curtain emitter, a receiving apparatus, and a computer host. U.S. Publication No. 2013/0343601 discloses a gesture-based human interface device (HID) system that is mounted over a working surface. The HID system has a camera that detects objects and actions and a projector that projects information onto the working surface. Taiwan Publication No. 201416944 discloses a scan projection touch apparatus, including a scanning mechanism, a visible light source, an invisible (infrared) light source, a semi-reflecting mirror, a second sensing unit, and a micro-processor. Taiwan Publication No. 201428415 discloses a projection apparatus, including an image-forming system and a light source system. U.S. Publication No. 2012/0038986 discloses a pattern projector including a light source and a lens, and the light source is an invisible light source.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides a touch and gesture control system having touch and gesture control functions.

The invention provides a touch and gesture control method, providing functions of a touch mode and a gesture control mode.

Other objects and advantages of the present invention can be further illustrated by the technical features broadly embodied and described as follows.

In order to achieve one or a portion of or all of the objects or other objects, an embodiment of the invention provides a touch and gesture control system. The touch and gesture control system includes a light curtain generating module, an invisible light lighting module, an image capturing module, and a control unit. The light curtain generating module is disposed at a side of a display area configured to generate a light curtain parallel to the display area to form a touch zone. The invisible light lighting module is configured to provide invisible light, wherein the invisible light is projected toward the display area to form a gesture control zone, and the touch zone and the gesture control zone are at least partially overlapped. The image capturing module is configured to form a sensing region, wherein the sensing region at least covers the touch zone and the gesture control zone. The control unit is respectively electrically connected with the light curtain generating module, the image capturing module, and the invisible light lighting module, and is configured to execute a touch mode and a gesture control mode. The control unit turns on the light curtain generating module and controls the image capturing module to capture a first set of images when executing the touch mode, and the control unit turns on the invisible light lighting module and controls the image capturing module to capture a second set of images when executing the gesture control mode.

In order to achieve one or a portion of or all of the objects or other objects, an embodiment of the invention provides a touch and gesture control method including steps as follows: executing a touch mode, wherein steps of executing the touch mode include: turning on a light curtain generating module, and causing the light curtain generating module generates a light curtain to form a touch zone, wherein the light curtain generating module is disposed at a side of a display area, and the light curtain is parallel to the display area; causing an image capturing module to detect a sensing region and capture a first set of images; and determining whether there is a touch signal according to the first set of images, outputting a touch command if there is the touch signal, and executing a gesture control mode if there is no touch signal; steps of executing the gesture control mode include: turning on an invisible light lighting module, and causing the invisible light lighting module projects invisible light toward the display area to form a gesture control zone; causing an image capturing module to detect the sensing region and capture a second set of images; and determining whether there is a gesture signal according to the second set of images, performing the steps of the touch mode again if there is no gesture signal, and identifying the gesture signal and outputting a gesture command accordingly if there is the gesture signal, wherein the sensing region at least covers the touch zone and the gesture control zone, and the touch zone and the gesture control zone are at least partially overlapped.

According to an embodiment of the invention, when the control unit executes the touch mode, the image capturing module detects the sensing region to capture the first set of images, the control unit determines whether there is a touch signal according to the first set of images and outputs a touch command if there is the touch signal, and executes the gesture control mode if there is no touch signal; and when the control unit executes the gesture control mode, the image capturing module detects the sensing region to capture the second set of images, the control unit determines whether there is a gesture signal according to the second set of images, and executes the touch mode again if there is no gesture signal, the control unit determines whether time after outputting the previous touch command exceeds a predetermined value if there is a gesture signal, and executes the touch mode again if the time does not exceed the predetermined value, and the control unit identifies the gesture signal and outputs a gesture command accordingly if the time exceeds the predetermined value.

According to an embodiment of the invention, the touch command includes a touch position in the touch zone computed according to the touch signal.

According to an embodiment of the invention, the control unit defines a plurality of time intervals of odd frames and a plurality of time intervals of even frames, the time intervals of the odd frames and the time intervals of the even frames proceed alternately, the control unit controls the time interval of the odd frames to be synchronized with time that the light curtain generating module generates the light curtain and controls the image capturing module to detect the sensing region during the time intervals of the odd frames to capture the first set of images, and the control unit controls the time interval of the even frames to be synchronized with time that the invisible light lighting module provides the invisible light and controls the image capturing module to detect the sensing region during the time intervals of the even frames to capture the second set of images.

According to an embodiment of the invention, the display area is a white plane or a white reflective layer.

According to an embodiment of the invention, the touch and gesture control system further includes a projection apparatus. The projection apparatus faces the display area and is configured to project an image beam onto the display area. The light curtain is located between the display area and the projection apparatus, and the invisible light lighting module and the image capturing module are respectively independent components and disposed on the projection apparatus.

According to an embodiment of the invention, the invisible light lighting module includes an invisible light source and a projection optical module. The invisible light source provides invisible light. The projection optical module is configured to project the invisible light emitted by the invisible light source toward the display area.

According to an embodiment of the invention, the touch and gesture control system further includes a projection apparatus. The projection apparatus faces the display area and is configured to project an image beam onto the display area. The light curtain is located between the display area and the projection apparatus, the image capturing module is disposed on the projection apparatus, and the invisible light lighting module is integrated into the projection apparatus.

According to an embodiment of the invention, the invisible light lighting module includes an invisible light filter.

According to an embodiment of the invention, the projection apparatus further includes a color wheel, and the invisible light filter is disposed on the color wheel.

According to an embodiment of the invention, the projection apparatus further includes a light source module, a light combining element, and a light valve. The light source module is configured to provide an illumination beam and the invisible light. The light combining element is configured to combine the invisible light and the illumination beam. The light valve is located on transmitting paths of the invisible light and the illumination beam, wherein an image beam and the invisible light are projected out of the projection apparatus after the illumination beam is converted into the image beam by the light valve.

According to an embodiment of the invention, the touch and gesture control method further includes steps as follows: before performing the step of identifying the gesture signal, determining whether time after outputting the previous touch command exceeds a predetermined value, executing the touch mode again if the time does not exceed the predetermined value, and identifying the gesture signal if the time exceeds the predetermined value.

According to an embodiment of the invention, the touch and gesture control method further includes steps as follows: defining a plurality of time intervals of odd frames and a plurality of time intervals of even frames, wherein the time intervals of the odd frames and the time intervals of the even frames proceed alternately; synchronizing the time interval of the odd frames with time that the light curtain generating module generates the light curtain; causing the image capturing module to detect the sensing region during the time intervals of the odd frames to capture the first set of images; synchronizing the time interval of the even frames with time that the invisible light lighting module provides the invisible light; and causing the image capturing module to detect the sensing region during the time intervals of the even frames to capture the second set of images.

Based on the above, the embodiments of the invention are capable of achieving at least one of the following functions or effects. The touch and gesture control system and touch and gesture control method according to the embodiments of the invention could execute the touch mode and the gesture control mode through configuring the image capturing module, the light curtain generating module, and the invisible light lighting module, controlling the time that the image capturing module captures the first set of images to be synchronized with the time that the light curtain generating module generates the light curtain and controlling the time that the image capturing module captures the second set of images to be synchronized with the time that the invisible light lighting module provides the invisible light, so as to make the touch and gesture control system have the touch and gesture control functions. In addition, the touch and gesture control system and the touch and gesture control method according to the embodiments of the invention are also able to identify the gesture signal and output the corresponding gesture command, so as to perform the operation related to gesture control. The touch and gesture control system and the touch and gesture control method according to the embodiments of the invention may reduce the possibility of misjudging the user's touch as gesture control by setting that the step of identifying the gesture signal is performed when the time after outputting a previous touch command exceeds a predetermined value.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIGS. 5D and 5E are schematic views illustrating a characteristic of a gesture signal after another gesture undergoes an image signal processing analysis according to an embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
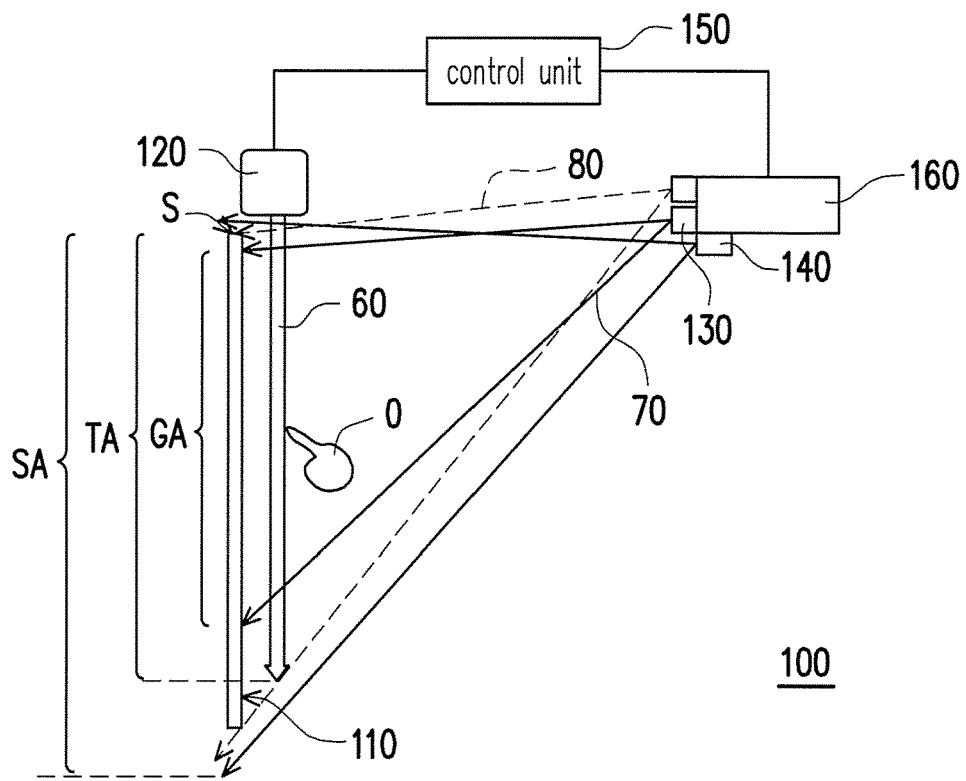
FIG. 1 is a schematic view illustrating a framework of a touch and gesture control system according an embodiment of the invention.
Figure 2:
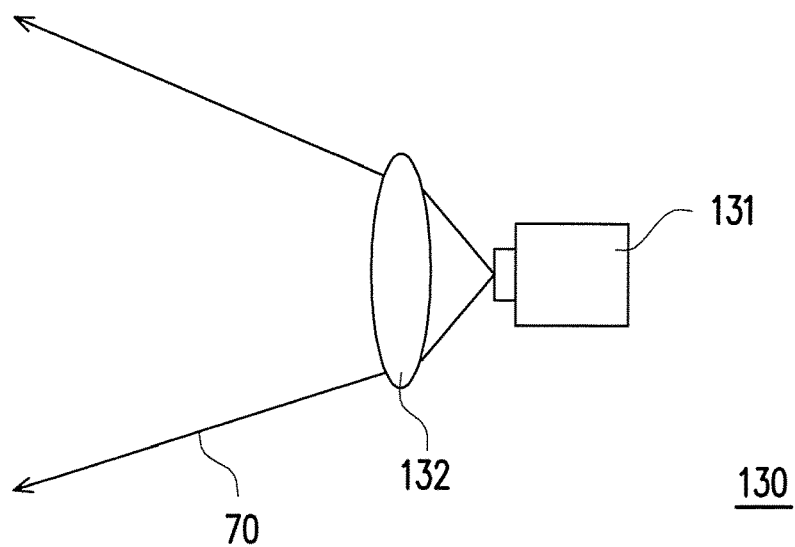
FIG. 2 is a schematic view illustrating a framework of an invisible light lighting module of FIG. 1.

FIG. 1 is a schematic view illustrating a framework of a touch and gesture control system according an embodiment of the invention. FIG. 2 is a schematic view illustrating a framework of an invisible light lighting module of FIG. 1. Referring to FIG. 1, a touch and gesture control system 100 of this embodiment includes a light curtain generating module 120, an invisible light lighting module 130, an image capturing module 140, and a control unit 150. For example, the touch and gesture control system 100 of this embodiment may be used with a large-sized display apparatus and may be operated by using a touch and a gesture. In this embodiment, the image capturing module 140 is configured to form a sensing region SA, and the sensing region SA at least covers a display area 110. The display area 110 is a white plane or a white reflective layer. For example, the display area 110 may be a conventional projection screen with a surface of a uniform and reflective white material, an electronic whiteboard, or a white wall surface. However, the invention is not limited thereto.

As shown in FIG. 1, the light curtain generating module 120 is disposed at a side S of the display area 110, so as to generate a light curtain 60 parallel to the display area 110. The light curtain 60 covers the whole display area 110 and forms a touch zone TA. In this embodiment, the light curtain generating module 120 may be disposed at a middle position on an upper edge of the display area 110, and a light emitting apparatus (not shown) of the light curtain generating module 120 may generate a light beam. In addition, a suitable optical component (not shown) may be used to make the light beam diverge to form the light curtain 60 covering the whole display area 110. In one embodiment, the light emitting apparatus of the light curtain generating module 120 is an infrared laser light source apparatus, such as an infrared laser light diode module, configured to generate an infrared laser light curtain. When a touch object O, such as a finger, a touch pen, or other objects, approaches the display area 110 (the light curtain 60), light is reflected, and the reflected light is detected by the image capturing module 140. The image capturing module 140 captures an image in the sensing region SA and the control unit 150 determines a touch position of the touch object O in the touch zone TA according to the captured image, so as to perform a touch function in a display apparatus.

As shown in FIG. 1, the touch and gesture control system 100 of this embodiment further includes a projection apparatus 160. The projector apparatus is, for example, a projector which has a projection lens. The projection apparatus 160 faces the display area 110 to project an image beam 80 onto the display area 110. The light curtain 60 is located between the display area 110 and the projection apparatus 160. In this embodiment, the invisible light lighting module 130 and the image capturing module 140 are respectively independent components, and are disposed on the projection apparatus 160 or near the projection apparatus 160. As shown in FIG. 2, the invisible light lighting module 130 includes an invisible light source 131 and a projection optical module 132 in this embodiment. The invisible light source 131 provides invisible light 70. The projection optical module 132 is located on a transmitting path of the invisible light 70, so as to project the invisible light 70 emitted by the invisible light source 131 toward the display area 110. For example, in this embodiment, the invisible light source 131 is an infrared laser diode light source or an infrared light emitting diode light source, and the invisible light 70 is infrared light. The projection optical module 132 may be a lens set, a diffractive optical element (DOE) or other optical components capable of projecting the invisible light 70 onto the display area 110. However, the invention is not limited thereto.

In this embodiment, the invisible light lighting module 130 is configured to provide the invisible light 70. The invisible light 70 is projected toward the display area 110, so as to form a gesture control zone GA. When the user 110 is in front of the display area 110 and makes a gesture in the gesture control zone GA, a corresponding shadow is formed on the display area 110, allowing the image capturing module 140 to capture the image in the sensing region SA or gesture control zone GA and use the control unit 150 to determine different gestures in the gesture control zone GA according to the captured image, so as to output different gesture commands and operate the display apparatus accordingly.

Referring to FIG. 1 again, in this embodiment, the image capturing module 140 may be a module sensing an infrared light image. For example, in this embodiment, the image capturing module 140 may be a complementary metal oxide semiconductor (CMOS) device or a charge-coupled device (CCD). However, the invention is not limited thereto. As shown in FIG. 1, in this embodiment, the sensing region SA at least covers the touch zone TA and the gesture control zone GA. In addition, the touch zone TA and the gesture control zone GA are at least partially overlapped, allowing the image capturing module 140 to capture an image in the touch zone TA and the gesture control zone GA.

As shown in FIG. 1, in this embodiment, the control unit 150 is respectively electrically connected with the light curtain generating module 120, the image capturing module 140, and the invisible light lighting module 130, so as to execute a touch mode and a gesture control mode. For example, in this embodiment, the control unit 150 may be a functional module realized in hardware and/or software. The hardware includes hardware having an image processing and/or data storing function such as a central processing unit, a chipset, a microprocessor, one or more memories, etc., or a combination of the aforesaid hardware components, and the software may be an operating system, a driver, etc. In addition, even though the control unit 150 and the projection apparatus 160 are described as independent components or devices in this embodiment, the invention is not limited thereto. In other embodiments, the control unit 150 may be integrated into the projection apparatus 160, and may still be respectively electrically connected with the light curtain generating module 120, the image capturing module 140, and the invisible light lighting module 130 and perform relevant functions. However, details in this respect are not further described in the following.

Specifically, as shown in FIG. 1, in this embodiment, when the touch and gesture control system 100 executes the touch mode, the control unit 150 turns on the light curtain generating module 120 to generate the light curtain 60, and controls the image capturing module 140 to capture a first set of images. When the gesture control mode is executed, the control unit 150 turns on the invisible light lighting module 130 and controls the image capturing module 140 to capture a second set of images.

In the following, a method for operating the touch and gesture control system of this embodiment to perform the touch function and display functions is described with reference to FIGS. 3 to 7B.

Figure 3:
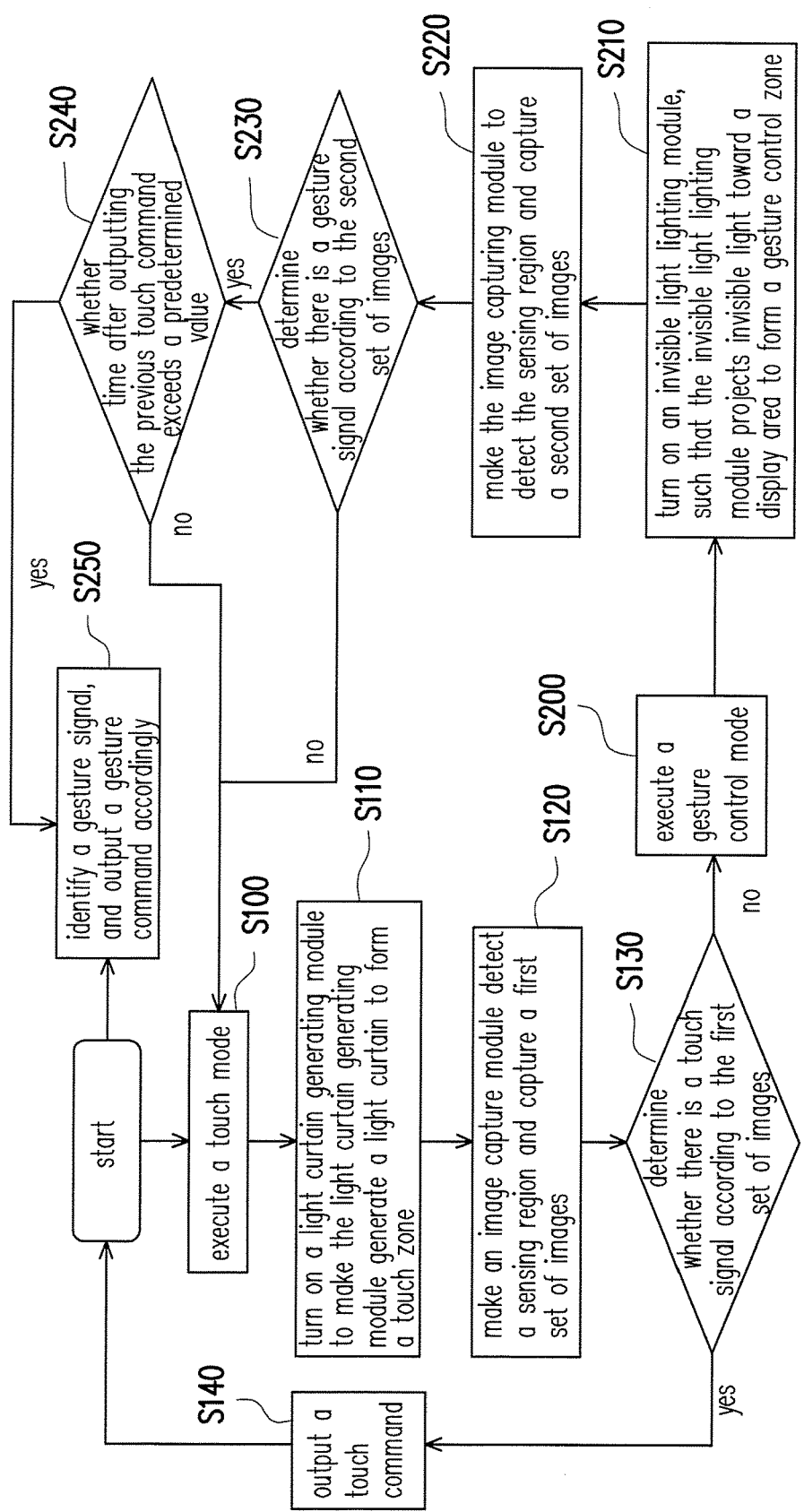
FIG. 3 is a flowchart illustrating a touch and gesture control method according to an embodiment of the invention.

FIG. 3 is a flowchart illustrating a touch and gesture control method according to an embodiment of the invention. Referring to FIG. 3, the touch and gesture control method of this embodiment may be executed by the touch and gesture control system 100 shown in FIG. 1. However, the invention is not limited thereto. Referring to FIGS. 1 and 3, a touch and gesture control method includes steps as follows. When the touch and gesture control system 100 starts operating, at Step S100, the touch mode is executed. A process of executing the touch mode includes steps as follows.

At Step S110, the light curtain generating module 120 is turned on, so that the light curtain generating module 120 generates the light curtain 60 parallel to the display area 110 to form the touch zone TA. At Step S120, the image capturing module 140 detects the sensing region SA to capture the first set of images. Step S130 is performed to determine whether there is a touch signal in the touch zone TA according to the first set of images. The touch signal refers to the light reflected when the touch object O such as a finger, a touch pen, or other objects approaches the light curtain 60. If there is a touch signal in the touch zone TA, Step S140 is performed to output a touch command. For example, the touch command includes the touch position of the touch object O computed, for example by using triangulation, in the touch zone TA and a touch image or an input generated on the display area 110, so as to perform the touch function on the display apparatus. If there is no touch signal in the touch zone TA, Step S200 is performed, i.e. the gesture control mode is executed. For example, in this embodiment, Steps S110, S120, and S130 are carried out by using the control unit 150 shown in FIG. 1 to control the light curtain generating module 120 and the image capturing module 140 and perform relevant computation. However, the invention is not limited thereto.

As shown in FIG. 3, in this embodiment, a process of executing the gesture control mode includes steps as follows. At Step 210, the invisible light lighting module 130 is turned on, so that the invisible light lighting module 130 projects the invisible light 70 toward the display area 110, so as to form the gesture control zone GA. At Step S220, the image capturing module 140 detects the sensing region SA to capture the second set of images. Step S230 is performed to determine whether there is a gesture signal in the gesture control zone GA according to the second set of images. If there is no gesture signal in the gesture control zone GA, it is returned to perform Step S100, namely the steps of the touch mode are executed again. If there is a gesture signal in the gesture control zone GA, Step S250 is performed to identify the gesture signal and output a gesture command accordingly. For example, obtaining the gesture command includes analyzing a gesture made by the user in the gesture control zone GA according to the gesture signal, so as to generate a corresponding input, thereby performing a gesture control function on the display apparatus. In this embodiment, Steps S210, S220, S230, and S250 may be carried out by using the control unit 150 shown in FIG. 1 to control the invisible light lighting module 130 and the image capturing module 140 and perform relevant computation. However, the invention is not limited thereto.

In the following, details about how the control unit 150 shown in FIG. 1 controls synchronization of the light curtain generating module 120, the invisible light lighting module 130, and the image capturing module 140 in the touch mode and the gesture control mode with reference to FIGS. 4A to 4C.

Figure 4A:
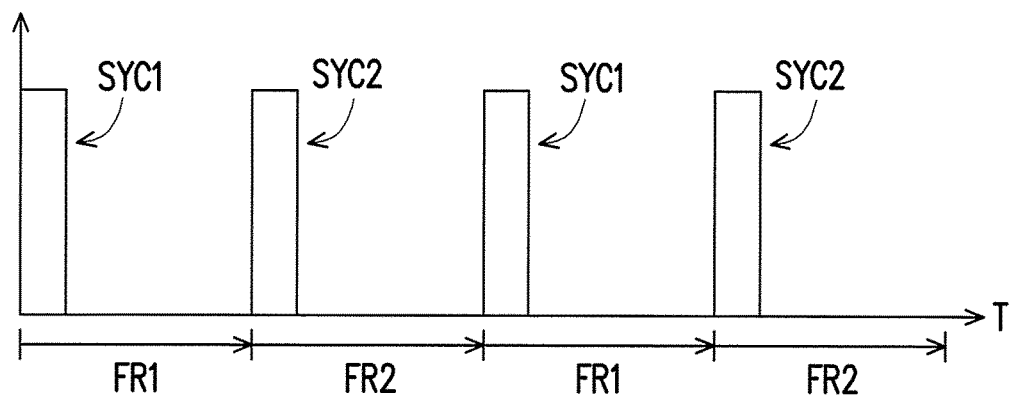
FIGS. 4A to 4C are schematic views illustrating a light curtain generating module, the invisible light lighting module, and an image capturing module of FIG. 1 receiving a plurality of synchronous signals and driving signals.
Figure 4B:
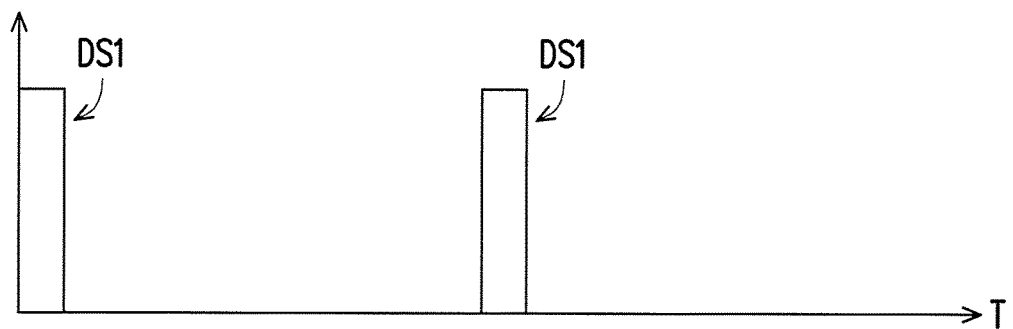
Figure 4C:
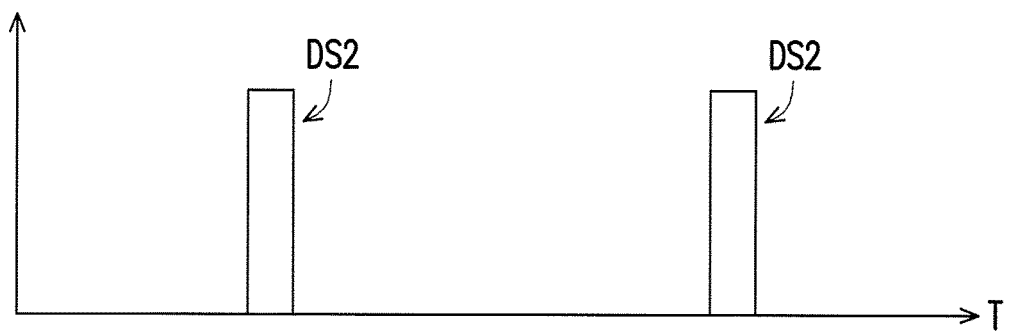

FIGS. 4A to 4C are schematic views illustrating the light curtain generating module 120, the invisible light lighting module 130, and the image capturing module 140 of FIG. 1 receiving a plurality of synchronous signals and driving signals. In this embodiment, the control unit 150 defines a plurality of time intervals of odd frames FR1 and a plurality of time intervals of even frames FR2. More specifically, as shown in FIG. 4A, in this embodiment, a method for the control unit 150 to define the time intervals of odd frames FR1 and the time intervals of even frames FR2 is based on the time intervals that the image capturing module 140 captures the images. For example, in this embodiment, a frequency that the image capturing module 140 captures an image is 60 Hz, therefore, the time interval of each odd frame FR1 and each even frame FR2 is 16.6 ms (milliseconds). In addition, the time intervals of odd frames FR1 and the time intervals of even frames FR2 proceed alternately, as shown in FIG. 4A. It should be noted that the numerical ranges described herein are only for an exemplary and illustrative purpose and are not intended to limit the invention.

As shown in FIGS. 4A and 4B, in this embodiment, the control unit 150 controls the time interval of odd frames FR1 to be synchronized with time that the light curtain generating module 120 generates the light curtain 60. In other words, during each time interval of odd frames FR1, the control unit 150 drives a pulse of each first synchronous signal SYC1 to be synchronized with a pulse of a first driving signal DS1 that the control unit 150 drives the light curtain generating module 120 to generate the light curtain 60. In addition, the control unit 150 controls the light curtain generating module 120 not to generate the light curtain 60 during each time interval of even frames FR2. As shown in FIGS. 4A and 4C, the control unit 150 controls the time interval of even frames FR2 to be synchronized with time that the invisible light lighting module 130 provides the invisible light 70. In other words, during each time interval of even frames FR2, the control unit 150 drives a pulse of each second synchronous signal SYC2 to be synchronized with a pulse of a second driving signal DS2 that the control unit 150 drives the invisible light lighting module 130 to provide the invisible light 70. In addition, the control unit 150 controls the invisible light lighting module 130 not to generate the invisible light 70 during each time interval of odd frames FR1. The duration of the pulses of the first driving signals DS1 and the second driving signal DS2 is, for example, 1.63 ms. In this way, the control unit 150 may control the image capturing module 140 to detect the sensing region SA during the time intervals of odd frames FR1 to capture the first set of images, so as to perform Step S120 (as shown in FIG. 3), and the control unit 150 may also control the image capturing module 140 to detect the sensing region SA during the time intervals of even frames FR2, so as to perform Step S220 (as shown in FIG. 3).

In the following, details about how the control unit 150 performs an image signal processing analysis on the second set of images to identify a gesture are described with reference to FIGS. 5A to 5E.

Figure 5A:
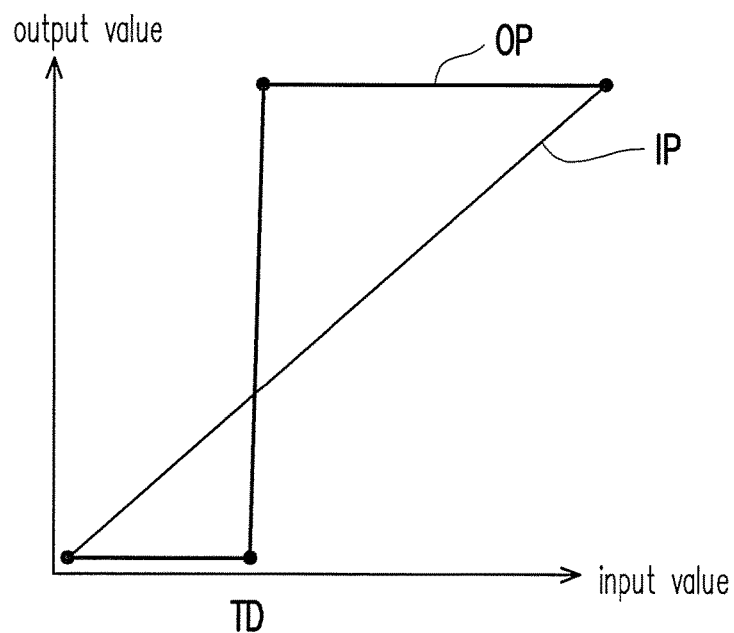
FIG. 5A is a schematic view of a gesture signal when a control unit of FIG. 1 performs an image signal processing analysis.
Figure 5B:
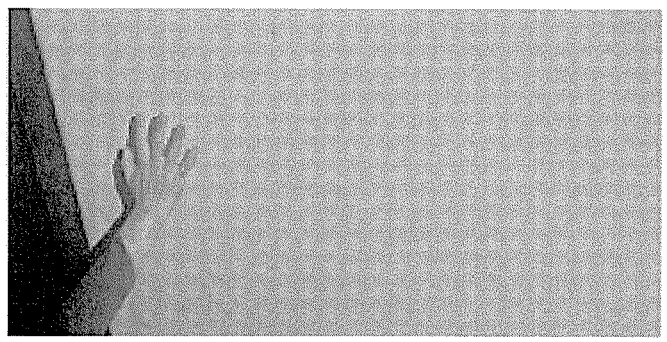
FIGS. 5B and 5C are schematic views illustrating a characteristic of a gesture signal after a gesture undergoes an image signal processing analysis according to an embodiment of the invention.
Figure 5C:
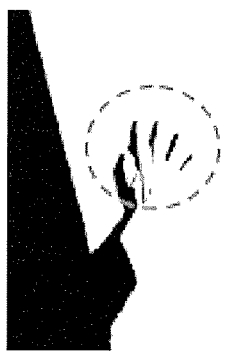

FIG. 5A is a schematic view of a gesture signal when the control unit of FIG. 1 performs an image signal processing analysis. FIGS. 5B and 5C are schematic views illustrating a characteristic of a gesture signal after a gesture undergoes an image signal processing analysis according to an embodiment of the invention. FIGS. 5D and 5E are schematic views illustrating a characteristic of a gesture signal after a gesture undergoes an image signal processing analysis according to another embodiment of the invention. Referring to FIGS. 5A to 5E, when an operation for touch and gesture control is performed by using the touch and gesture control system 100, the user is often around the display area 110. Since the display area 110 of this embodiment is, for example, a white plane or a white reflective layer, a gesture signal is identifiable according to a shadow of the user's gesture on the display area 110.

For example, as shown in FIG. 5A, in this embodiment, a image polarization process may be performed on the image signal of the second set of images, such that a portion of the second set of images having an image gray-scale value higher than a predetermined threshold TD is set to be white, and a portion having an image gray-scale value lower than the predetermined threshold TD is set to be black. Thus, as shown in FIG. 5A, by performing the image polarization process, an input image signal IP of the second set of images is converted into an output image signal OP to distinguish a characteristic of the user's finger, so as to identify whether there is a specific gesture signal.

As shown in FIGS. 5B and 5C, when the five fingers of the user are stretched out, with the image polarization process, the control unit 150 may identify that the second set of images have an image characteristic with five fingers, so as to determine that this is a specific gesture signal. Alternatively, as shown in FIGS. 5D and 5E, when the user extends the index finger and the middle finger, with the image polarization process, the control unit 150 may identify that the second set of images have an image characteristic with two fingers, so as to determine that this is another specific gesture signal. In this way, the control unit 150 may output a corresponding gesture command through identification of the gesture signal, thereby performing an operating function of gesture control. The relationship between the gesture and the corresponding gesture command may be obtained by using a lookup table which may be stored in advance in a memory of the control unit 150.

Figure 6A:
FIGS. 6A to 6E respectively illustrate five gestures that are identifiable for the control unit of FIG. 1.
Figure 6B:
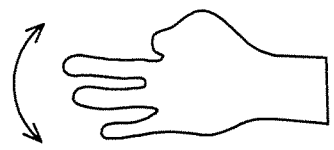
Figure 6C:
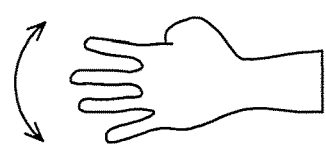
Figure 6D:
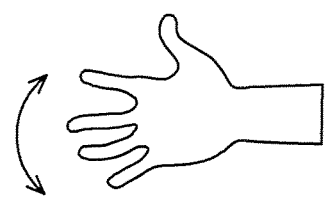
Figure 6E:
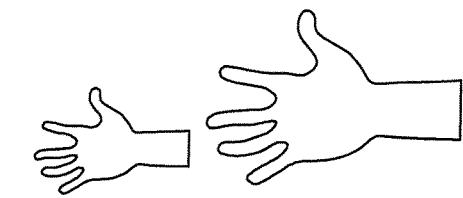

FIGS. 6A to 6E respectively illustrate five gestures that are identifiable by the control unit 150 of FIG. 1. For example, referring to FIGS. 6A to 6E, the gesture shown in FIG. 6A is a gesture command corresponding to extending the index and middle fingers. Swinging the gesture leftward corresponds to a function of returning to the previous page, and swinging the gesture rightward corresponds to a function of going to the next page. The gesture shown in FIG. 6B is a gesture command corresponding to extending three fingers. Swinging the gesture leftward corresponds to a function of going to the first page, and swinging the gesture rightward corresponds to a function of skipping to the last page. The gesture shown in FIG. 6C is a gesture command corresponding to swinging four extending fingers, which corresponds to a function of switching programs. The gesture shown in FIG. 6D is a gesture command corresponding to swinging five extending fingers, which corresponds to a function of terminating a program. The gesture shown in FIG. 6E is a gesture command corresponding to five extending fingers moving backward and forward. Moving forward corresponds to a function of zoom-in display, and moving backward corresponds to a function of zoom-out display. However, the invention is not limited to the aforementioned gestures and the corresponding gesture commands and functions. In other words, the types of gestures are not limited to four types. In other embodiments, other gestures may also be used. Corresponding relations of gestures, gesture commands, and functions are not limited to the aforementioned relations. In other embodiments, other corresponding relations may be set.

Referring to FIG. 3 again, in this embodiment, after it is determined that there is a touch signal and a touch command is output, detection starts again, and the touch mode is executed again, so as to avoid misjudging the user's touch as a gesture. As shown in FIG. 3, to avoid misjudging a touch operation as a gesture due to changing of action (e.g. changing with strokes in writing) during the touch operation, Step S240 may be performed after determining whether there is a gesture signal at Step 230, so as to determine whether time after outputting a previous touch command exceeds a predetermined value. For example, the predetermined value of time may be 0.1 seconds or other suitable value, but the invention is not limited thereto. If the time after outputting the previous touch command does not exceed the predetermined value, it is returned to Step 100 to execute the touch mode again. If the time after outputting the previous touch command exceeds the predetermined value, Step S250 is performed to carry out identification of gesture signal and output a gesture command accordingly.

Figure 7A:
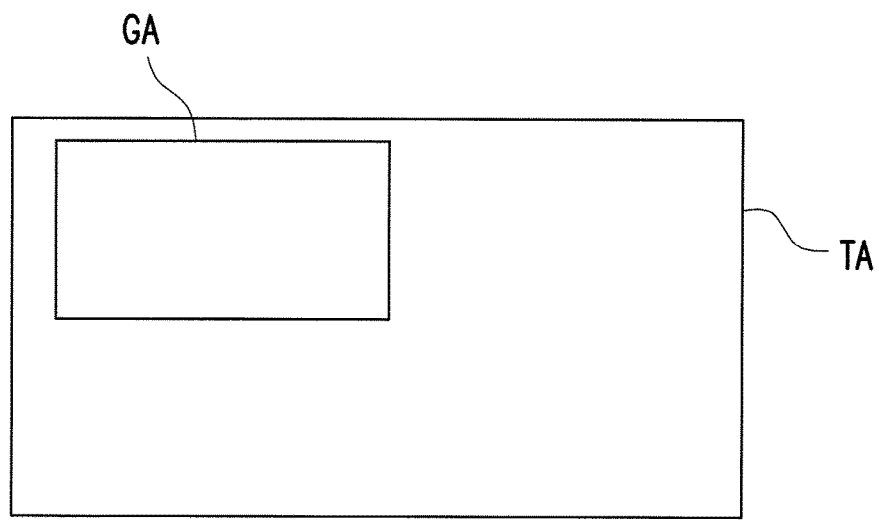
FIGS. 7A and 7B are schematic views illustrating different gesture control zones of FIG. 1.
Figure 7B:
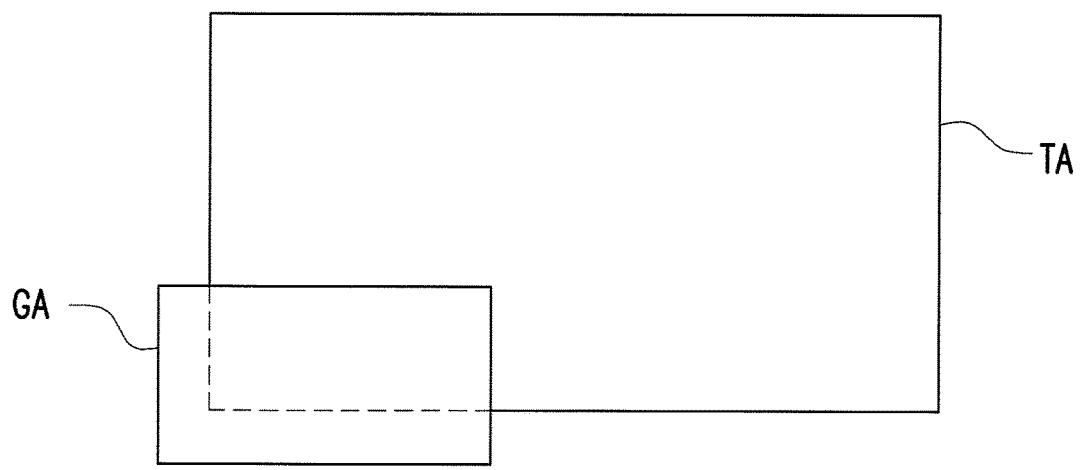

FIGS. 7A and 7B are schematic views illustrating different gesture control zones of FIG. 1. As shown in FIGS. 7A and 7B, in this embodiment, the touch and gesture control system 100 may adjust or designate the range of the gesture control zone GA through the control unit 150. Accordingly, a suitable way of operating the system may be determined according to the user's customs or height. As shown in FIG. 7A, the whole gesture control zone GA is overlapped with the touch zone TA. As shown in FIG. 7B, in another embodiment, the user may control part of the touch zone TA and the gesture control zone GA to be overlapped and the other part not to be overlapped by setting the range of the gesture control zone GA, so as to meet the requirements of the user's operations. For example, the user may operate on a portion where the touch zone TA and the gesture control zone GA are overlapped, so as to use the touch and gesture control functions at the same time. Alternatively, the user may separately perform the touch and gesture control functions in the touch zone TA and the gesture control zone GA that are not overlapped with each other when the operations, for example, are complex and confusing, so as to avoid misjudging the user's touch as a gesture.

It should be noted that while the invisible light lighting module 130 is exemplarily described as an independent component and disposed on the projection apparatus 160, the invention is not limited thereto. In other embodiments, the invisible light lighting module 130 may be integrated into the projection apparatus 160. In the following, further details are provided with reference to FIGS. 8A to 9.

Figure 8A:
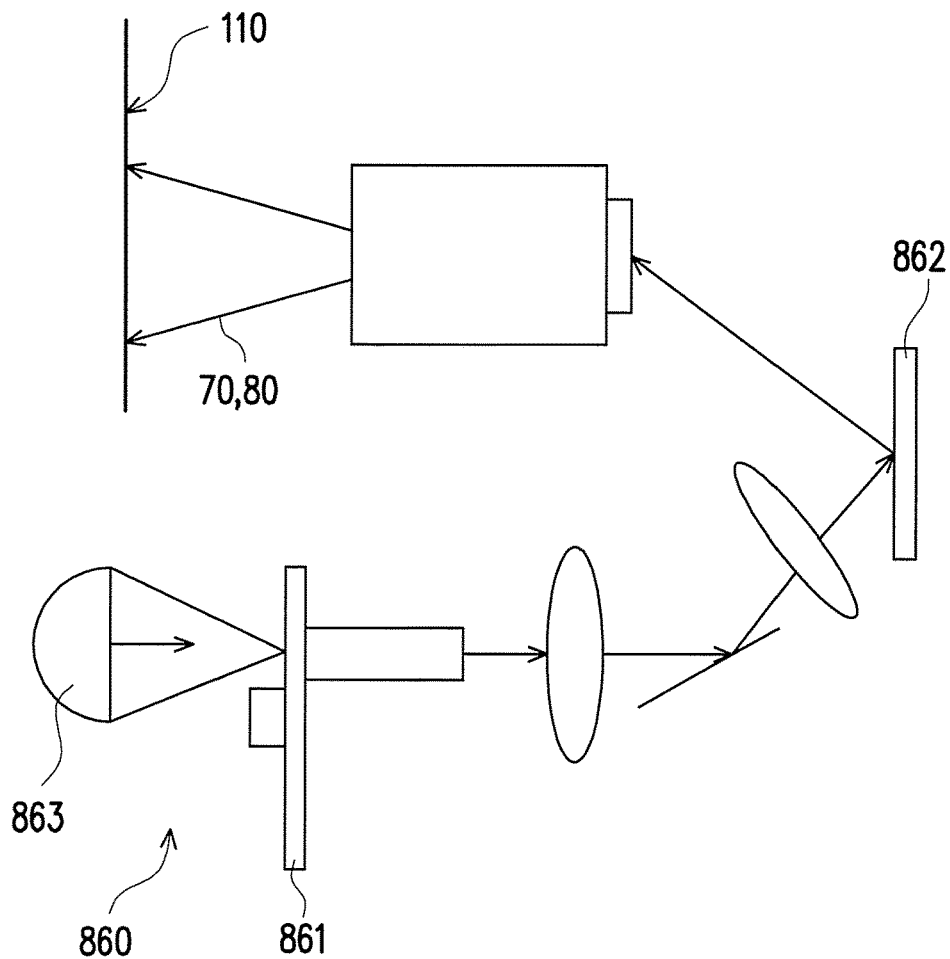
FIG. 8A is a schematic view illustrating a framework of a projection apparatus according to another embodiment of the invention.
Figure 8B:
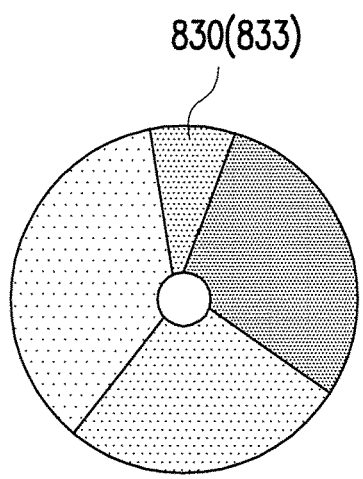
FIG. 8B is a schematic front view illustrating a color wheel of the projection apparatus of FIG. 8A.

FIG. 8A is a schematic view illustrating a framework of a projection apparatus according to another embodiment of the invention. FIG. 8B is a schematic front view illustrating a color wheel of the projection apparatus of FIG. 8A. Referring to FIGS. 8A and 8B, in this embodiment, a projection apparatus 860 of FIG. 8A is similar to the projection apparatus 160, and a main difference there between is as follows. As shown in FIG. 8A, the projection apparatus 860 faces the display area 110 and is configured to project the image beam 80 onto the display area 110. The projection apparatus 860 includes a light source 863, a color wheel 861, and a light valve 862. For example, in this embodiment, the projection apparatus 860 is a projector with a conventional ultra high pressure mercury lamp and using the digital light processing (DLP) technology. However, the invention is not limited thereto. More specifically, as shown in FIG. 8B, in this embodiment, an invisible light lighting module 830 includes an invisible light filter 833, and the invisible light filter 833 is disposed on the color wheel 861 to allow invisible light to pass through and block visible lights (visible lights may pass through other filter segments of the color wheel 861). In other words, in this embodiment, the invisible light lighting module 830 is integrated in the projection apparatus 860.

Thus, when the light source 863 of the projection apparatus 860 emits light, the invisible light 70 may be generated by using the invisible light filter 833. With modulation by the light valve 862 of the projection apparatus 860, the projection apparatus 860 may emit the invisible light 70 at the same time when projecting the image beam 80 onto the display area 110. Similarly, in this embodiment, time that the invisible light lighting module 830 (the invisible light filter 833) of the projection apparatus 860 provides the invisible light 70 may also be controlled to be synchronized with the time that the image capturing module 140 captures the second set of images. Thus, the invisible light lighting module 830 and the projection apparatus 860 may be used in the touch and gesture control system 100 shown in FIG. 1 and may also be used to carry out the touch and gesture control method shown in FIG. 3 to allow the touch and gesture control system 100 achieve the foregoing functions, and details thereof are not repeated.

Figure 9:
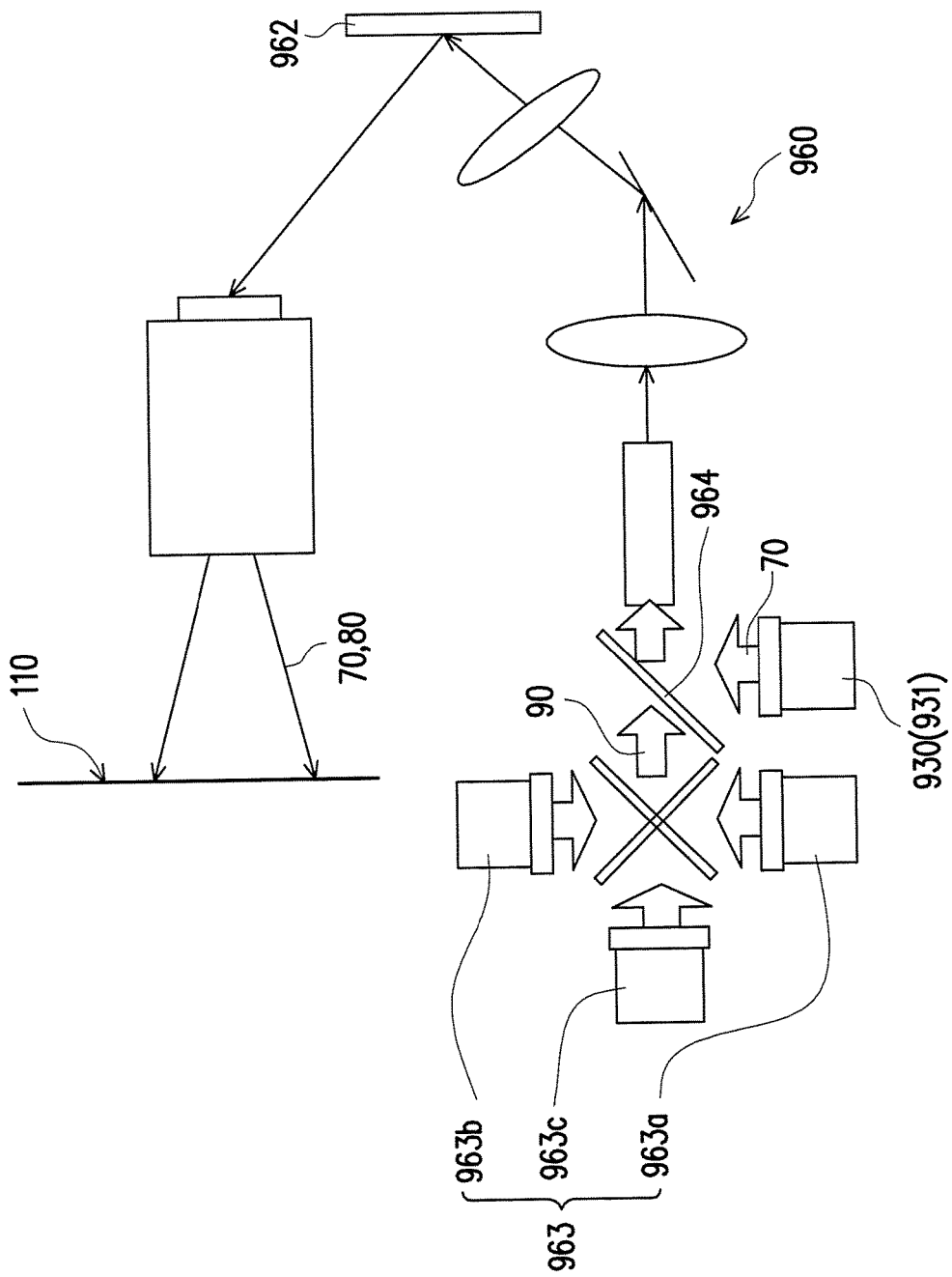
FIG. 9 is a schematic view illustrating a framework of a projection apparatus according to yet another embodiment of the invention.

FIG. 9 is a schematic view illustrating a framework of a projection apparatus according to yet another embodiment of the invention. Referring to FIG. 9, in this embodiment, a projection apparatus 960 shown in FIG. 9 is similar to the projection apparatus 860 shown in FIG. 8A, and a main difference there between is as follows. As shown in FIG. 9, the projection apparatus 960 further includes a light source module 963, a light combining element 964, and a light valve 962. For example, in this embodiment, the projection apparatus 960 is a projector with a solid-state light source and using the digital light processing technology. The light combining element 964 may be a X-plate, a X cube or a prism. The solid-state light source includes a light emitting device such as a light emitting diode or a laser diode. However, the invention is not limited thereto. In this embodiment, the light source module 963 includes a plurality of visible light sources 963a, 963b, and 963c and an invisible light source 931, so as to respectively provide an illumination beam 90 and the invisible light 70. In this embodiment, the visible light sources 963a, 963b, and 963c are light sources respectively emitting red, green, and blue light, for example, and the invisible light source 931 is a light source emitting infrared light, for example. However, the invention is not limited thereto. In other words, in this embodiment, an invisible light lighting module 930 includes the invisible light source 931. The light combining element 963 is located on transmitting paths of the invisible light 70 and the illumination beam 90, so as to combine the invisible light 70 and the illumination beam 90. The light valve 962 is located on the transmitting paths of the invisible light 70 and the illumination beam 90. The image beam 80 and the invisible light 70 are projected out of the projection apparatus 960 after the illumination beam 90 is converted into the image beam 80 by the light valve 962.

Similarly, in this embodiment, time that the invisible light lighting module 930 (the invisible light source 931) of the projection apparatus 960 provides the invisible light 70 may also be controlled to be synchronized with the time that the image capturing module 140 captures the second set of images. Thus, the invisible light lighting module 930 and the projection apparatus 960 may be used in the touch and gesture control system 100 shown in FIG. 1 and may also be used to carry out the touch and gesture control method shown in FIG. 3 to allow the touch and gesture control system 100 achieve the foregoing functions, and details thereof are not repeated.

Figure 10:
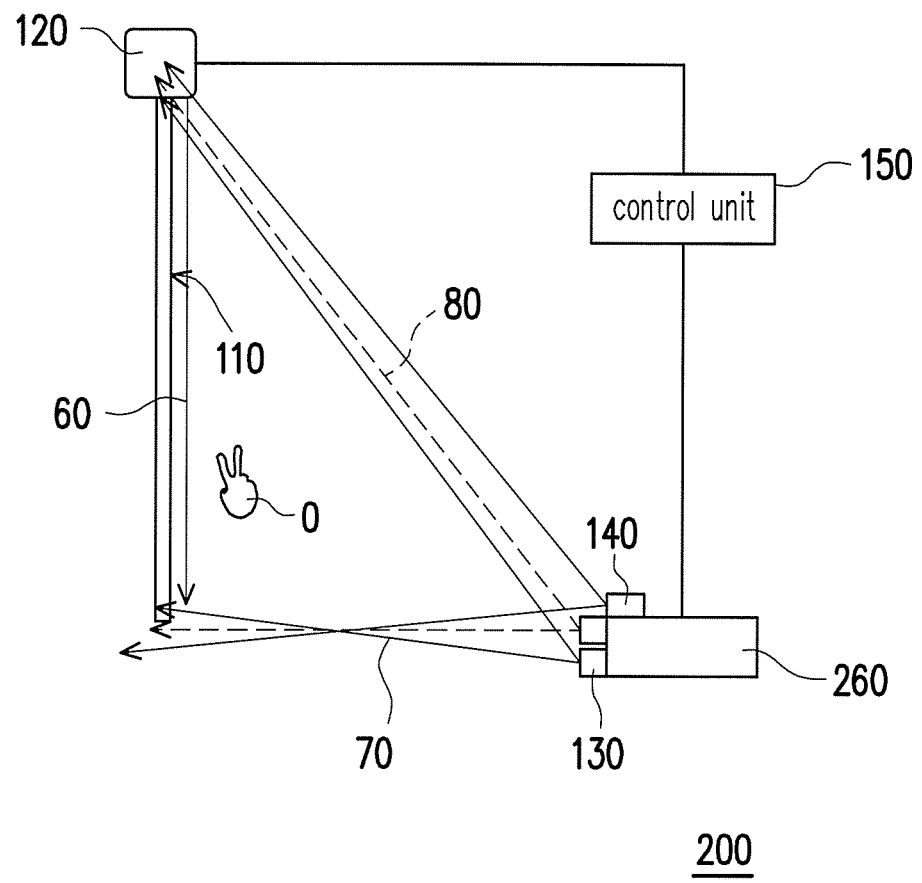
FIG. 10 is a schematic view illustrating a framework of a touch and gesture control system according another embodiment of the invention.

FIG. 10 is a schematic view illustrating a framework of a touch and gesture control system according another embodiment of the invention. Referring to FIG. 10, in this embodiment, a touch and gesture control system 200 shown in FIG. 10 is similar to the touch and gesture control system 100 shown in FIG. 1, and a main difference there between is as follows. As shown in FIG. 10, in this embodiment, a projection apparatus 260 is a pico projector, and the invisible light lighting module 130 and the image capturing module 140, together with the projection apparatus 260, form a portable projector emitting the invisible light 70 and the image beam 80.

The touch and gesture control system 200 of this embodiment is configured with the image capturing module 140, the light curtain generating module 120, and the invisible light lighting module 130, and controls the time that the image capturing module 140 captures the first set of images to be synchronized with the time that the light curtain generating module 120 generates the light curtain 60 and the time that the image capturing module 140 captures the second set of images to be synchronized with the time that the invisible light lighting module 130 provides the invisible light 70, so as to carry out the touch and gesture control method shown in FIG. 3 and make the touch and gesture control system 200 have the touch and gesture control functions. Thus, the touch and gesture control system 200 achieves the same functions as those of the touch and gesture control system 100, and details thereof are not repeated.

In view of the foregoing, the touch and gesture control system and touch and gesture control method according to the embodiments of the invention are provided with one image capturing module, the light curtain generating module, and the invisible light lighting module, and controls the time that the image capturing module captures the first set of images to be synchronized with the time that the light curtain generating module generates the light curtain and controls the time that the image capturing module captures the second set of images to be synchronized with the time that the invisible light lighting module provides the invisible light, so as to execute the touch mode and the gesture control mode and make the touch and gesture control system have the touch and gesture control functions. In addition, the touch and gesture control system and the touch and gesture control method according to the embodiments of the invention are also able to identify the gesture signal and output the corresponding gesture command, so as to perform the operation related to gesture control accordingly. The touch and gesture control system and the touch and gesture control method according to the embodiments of the invention may reduce the possibility of misjudging the user's touch as gesture control by setting that the step of identifying the gesture signal is performed when the time after outputting a previous touch command exceeds a predetermined value, thereby allowing the touch and gesture control system to accurately perform the touch and gesture control.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch and gesture control system, comprising:
a light curtain generating module, disposed at a side of a display area, configured to generate a light curtain parallel to the display area and to form a touch zone;
an invisible light lighting module, configured to provide invisible light, wherein the invisible light is projected toward the display area to form a gesture control zone, and the touch zone and the gesture control zone are at least partially overlapped;
an image capturing module, configured to form a sensing region, wherein the sensing region at least covers the touch zone and the gesture control zone; and
a control unit, respectively electrically connected with the light curtain generating module, the image capturing module, and the invisible light lighting module and configured to execute a touch mode and a gesture control mode, wherein the control unit turns on the light curtain generating module and controls the image capturing module to capture a first set of images when executing the touch mode, and the control unit turns on the invisible light lighting module, and controls the image capturing module to capture a second set of images when executing the gesture control mode, wherein when the control unit executes the touch mode, the image capturing module detects the sensing region to capture the first set of images, the control unit determines whether there is a touch signal according to the first set of images, and outputs a touch command if there is the touch signal, and executes the gesture control mode if there is no touch signal, and wherein when the control unit executes the gesture control mode, the image capturing module detects the sensing region to capture the second set of images, determines whether there is a gesture signal according to the second set of images, and executes the touch mode again if there is no gesture signal, the control unit determines whether time after outputting the previous touch command exceeds a predetermined value if there is the gesture signal, and executes the touch mode again if the time does not exceed the predetermined value, and the control unit identifies the gesture signal and outputs a gesture command if the time exceeds the predetermined value.

2. The touch and gesture control system as claimed in claim 1, wherein the touch command comprises a touch position in the touch zone computed according to the touch signal.

3. The touch and gesture control system as claimed in claim 1, wherein the control unit defines a plurality of time intervals of odd frames and a plurality of time intervals of even frames, the time intervals of the odd frames and the time intervals of the even frames proceed alternately, the control unit controls the time interval of the odd frames to be synchronized with time that the light curtain generating module generates the light curtain and controls the image capturing module to detect the sensing region during the time intervals of the odd frames to capture the first set of images, and the control unit controls the time interval of the even frames to be synchronized with time that the invisible light lighting module provides the invisible light and controls the image capturing module to detect the sensing region during the time intervals of the even frames to capture the second set of images.

4. The touch and gesture control system as claimed in claim 1, wherein the display area is a white plane or a white reflective layer.

5. The touch and gesture control system as claimed in claim 1, further comprising:
a projection apparatus, facing the display area and configured to project an image beam onto the display area, wherein the light curtain is located between the display area and the projection apparatus, and the invisible light lighting module and the image capturing module are respectively independent components and disposed on the projection apparatus.

6. The touch and gesture control system as claimed in claim 5, wherein the invisible light lighting module comprises:
an invisible light source, providing the invisible light; and
a projection optical module, configured to project the invisible light emitted by the invisible light source toward the display area.

7. The touch and gesture control system as claimed in claim 1, further comprising:

a projection apparatus, facing the display area and configured to project an image beam onto the display area, wherein the light curtain is located between the display area and the projection apparatus, the image capturing module is disposed on the projection apparatus, and the invisible light lighting module is integrated into the projection apparatus.

8. The touch and gesture control system as claimed in claim 7, wherein the invisible light lighting module comprises an invisible light filter.

9. The touch and gesture control system as claimed in claim 8, wherein the projection apparatus further comprises a color wheel, and the invisible light filter is disposed on the color wheel.

10. The touch and gesture control system as claimed in claim 7, wherein the projection apparatus further comprises:
a light source module, configured to provide an illumination beam and the invisible light;
a light combining element, configured to combine the invisible light and the illumination beam; and
a light valve, located on transmitting paths of the invisible light and the illumination beam, wherein the image beam and the invisible light are projected out of the projection apparatus after the illumination beam is converted into the image beam by the light valve.

11. A touch and gesture control method, comprising:
executing a touch mode, wherein steps of the touch mode comprise:
turning on a light curtain generating module, and causing the light curtain generating module generates a light curtain to form a touch zone, wherein the light curtain generating module is disposed at a side of a display area, and the light curtain is parallel to the display area;
causing an image capturing module to detect a sensing region and capture a first set of images; and
determining whether there is a touch signal according to the first set of images, outputting a touch command if there is the touch signal, and executing a gesture control mode if there is no touch signal, wherein steps of the gesture control mode comprise:
turning on an invisible light lighting module, and causing the invisible light lighting module projects invisible light toward the display area to form a gesture control zone;
causing the image capturing module to detect the sensing region and capture a second set of images;
determining whether there is a gesture signal according to the second set of images, performing the steps of the touch mode again if there is no gesture signal, and identifying the gesture signal and outputting a gesture command if there is the gesture signal, wherein the sensing region at least covers the touch zone and the gesture control zone, and the touch zone and the gesture control zone are at least partially overlapped; and
before performing the step of identifying the gesture signal, determining whether time after outputting the previous touch command exceeds a predetermined value, executing the touch mode again if the time does not exceed the predetermined value, and executing the step of identifying the gesture signal if the time exceeds the predetermined value.

12. The touch and gesture control method as claimed in claim 11, wherein the touch command comprises a touch position in the touch zone computed according to the touch signal.

13. The touch and gesture control method as claimed in claim 11, further comprising:

defining a plurality of time intervals of odd frames and a plurality of time intervals of even frames, wherein the time intervals of the odd frames and the time intervals of the even frames proceed alternately;

synchronizing the time interval of the odd frames with time that the light curtain generating module generates the light curtain;

causing the image capturing module to detect the sensing region during the time intervals of the odd frames to capture the first set of images;

synchronizing the time interval of the even frames with time that the invisible light lighting module provides the invisible light; and causing the image capturing module to detect the sensing region during the time intervals of the even frames to capture the second set of images.

14. The touch and gesture control method as claimed in claim 11, wherein the display area is a white plane or a white reflective layer.

15. The touch and gesture control method as claimed in claim 11, wherein the invisible light lighting module and the image capturing module are respectively independent components and disposed on a projection apparatus facing the display area, the light curtain is located between the display area and the projection apparatus, and the invisible light lighting module comprises:

an invisible light source, providing the invisible light; and a projection optical module, configured to project the invisible light emitted by the invisible light source toward the display area.

16. The touch and gesture control method as claimed in claim 11, wherein the invisible light lighting module is integrated in a projection apparatus, the projection apparatus faces the display area, the light curtain is located between the display area and the projection apparatus, and the invisible light lighting module comprises an invisible light filter.

17. The touch and gesture control method as claimed in claim 16, wherein the projection apparatus further comprises a color wheel, and the invisible light filter is disposed on the color wheel.

18. The touch and gesture control method as claimed in claim 11, wherein the invisible light lighting module is integrated in a projection apparatus, the projection apparatus faces the display area, the light curtain is located between the display area and the projection apparatus, and the projection apparatus further comprises:

a light source module, configured to provide an illumination beam and the invisible light;

a light combining element, configured to combine the invisible light and the illumination beam; and a light valve, located on transmitting paths of the invisible light and the illumination beam, wherein an image beam and the invisible light are projected out of the projection apparatus after the illumination beam is converted into the image beam by the light valve.

19. A touch and gesture control system, comprising:

a light curtain generating module, disposed at a side of a display area, configured to generate a light curtain parallel to the display area and to form a touch zone;

an invisible light lighting module, configured to provide invisible light, wherein the invisible light is projected toward the display area to form a gesture control zone, and the touch zone and the gesture control zone are at least partially overlapped;

an image capturing module, configured to form a sensing region, wherein the sensing region at least covers the touch zone and the gesture control zone; and a control unit, respectively electrically connected with the light curtain generating module, the image capturing module, and the invisible light lighting module and configured to execute a touch mode and a gesture control mode, wherein the control unit turns on the light curtain generating module and controls the image capturing module to capture a first set of images when executing the touch mode, and the control unit turns on the invisible light lighting module, and controls the image capturing module to capture a second set of images when executing the gesture control mode, wherein the control unit defines a plurality of time intervals of odd frames and a plurality of time intervals of even frames, the time intervals of the odd frames and the time intervals of the even frames proceed alternately, the control unit controls the time interval of the odd frames to be synchronized with time that the light curtain generating module generates the light curtain and controls the image capturing module to detect the sensing region during the time intervals of the odd frames to capture the first set of images, and the control unit controls the time interval of the even frames to be synchronized with time that the invisible light lighting module provides the invisible light and controls the image capturing module to detect the sensing region during the time intervals of the even frames to capture the second set of images.

20. A touch and gesture control method, comprising:

executing a touch mode, wherein steps of the touch mode comprise:

turning on a light curtain generating module, and causing the light curtain generating module generates a light curtain to form a touch zone, wherein the light curtain generating module is disposed at a side of a display area, and the light curtain is parallel to the display area;

causing an image capturing module to detect a sensing region and capture a first set of images; and determining whether there is a touch signal according to the first set of images, outputting a touch command if there is the touch signal, and executing a gesture control mode if there is no touch signal, wherein steps of the gesture control mode comprise:

turning on an invisible light lighting module, and causing the invisible light lighting module projects invisible light toward the display area to form a gesture control zone;

causing the image capturing module to detect the sensing region and capture a second set of images;

determining whether there is a gesture signal according to the second set of images, performing the steps of the touch mode again if there is no gesture signal, and identifying the gesture signal and outputting a gesture command if there is the gesture signal, wherein the sensing region at least covers the touch zone and the gesture control zone, and the touch zone and the gesture control zone are at least partially overlapped;

defining a plurality of time intervals of odd frames and a plurality of time intervals of even frames, wherein the time intervals of the odd frames and the time intervals of the even frames proceed alternately;

synchronizing the time interval of the odd frames with time that the light curtain generating module generates the light curtain;

causing the image capturing module to detect the sensing region during the time intervals of the odd frames to capture the first set of images;

synchronizing the time interval of the even frames with time that the invisible light lighting module provides the invisible light; and causing the image capturing module to detect the sensing region during the time intervals of the even frames to capture the second set of images.

* * * * *